UNITED STATES PATENT OFFICE.

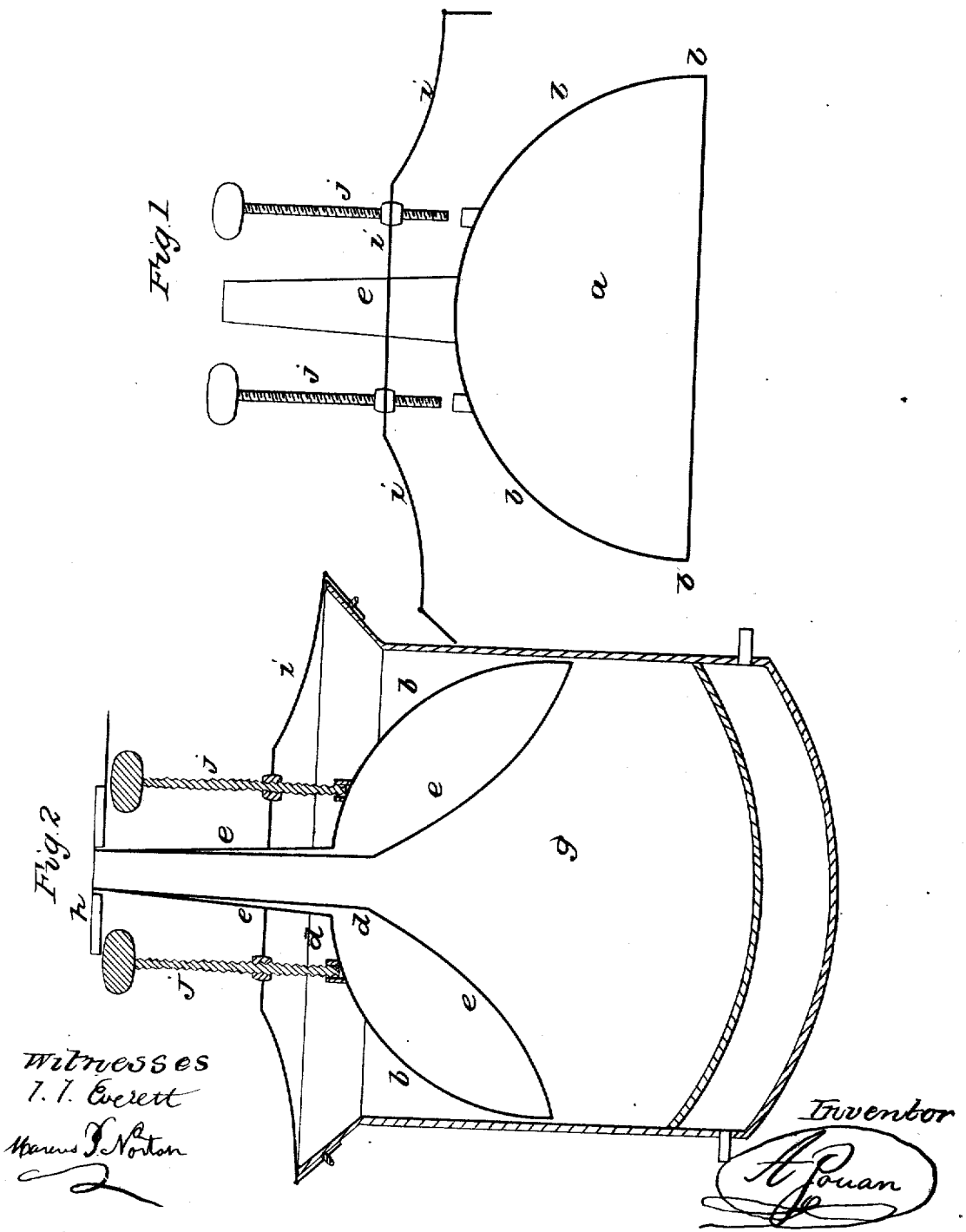

AUGUSTUS JOUAN, OF SAN FRANCISCO, CALIFORNIA.

IMPROVEMENT IN APPARATUS FOR EVAPORATING SUGAR-JUICE.

Specification forming part of Letters Patent No. 22,732, dated January 25, 1859.

*To all whom it may concern:*

Be it known that I, AUGUSTUS JOUAN, of San Francisco, in the State of California, have invented a new and useful Floating-Cover Apparatus for Cooking Sugar; and I do hereby declare the following to be a full and exact description thereof, reference being had to the accompanying drawings, and to the letters and marks thereon.

Of the drawings forming part of this specification, Figure 1 is a perspective view of the cover and means for guiding it, Fig. 2 being a sectional view of the cover and pan.

My invention consists in the addition of a floating cover to the ordinary sugar-pan. The cover $a$ is made of metal. It is hollow, of a convexo-concave form, as shown by the drawings, of a weight so as to float in saccharine liquids, and with an arrangement allowing it to be more or less immerged, as circumstances may require. It is composed of two parts, one of which, $b$, is convex and the other, $c$, concave. The convex, which forms the upper part of the cover, is semi-spherical, while the concave part represents the form of a funnel. In the center of each part is a hole, $d$, to which is attached a distinct tube, there being thus two tubes running parallel. The exterior tube, $e$, is slightly conical from about two inches before its junction with the other tube. At about two inches above its base the external tube, $e$, has an opening, $o$, which is very small, designed only for the purpose of allowing the air in the cover to expand when it has become heated. This opening $o$ is partly covered, so as not to admit the sirup ejected by the tube to enter into the cavity of the cover. The base of the cover $f$ is circular; it may be of any other form, to suit that of the pan. It must be adjusted to the pan $g$, but not so as to close hermetically, as the liquid, when ejected from the tube, must return under the cover, passing through the slight space between the cover and the sides of the pan. In length the tubes $e$ $d$ should be about two-thirds the diameter of the pan, and their diameter be in proportion to said diameter as one inch is to a foot. A movable sieve can be adapted to the tube, as shown at $h$ on the drawings. Above this sieve there can be placed another one; but the one shown is specially for detaining the grosser parts and impurities of the liquid at the beginning of the operation. The sieve $h$ has a handle, so that it can be taken off the tube whenever desirable.

To govern the cover and to plunge it more or less downward and maintain it in position, a collar, $i$, is used, which passes over the center of the pan and is attached to the sides of the pan. It has an arrangement of screw-rods $j$ connected to it, for the purpose of forcing and holding the cover below the line at which its buoyancy would sustain it.

*Modus operandi:* The liquid in the pan should have added to it the necessary ingredients for cleaning it, and should be stirred as in the usual or ordinary mode. Then the cover is placed in its position, and a moderate fire is maintained till after the first eruption of the liquid through the tube. From that moment the heat is increased to any degree required till the sirup has acquired about 30° Baumé's hydrometer. Then again the fire is moderated, not to injure the process of crystallization, and it is maintained with moderate heat till the end of the operation. At the beginning of the operation the cover is only compressed to such a degree as to make it steady; but when the sirup has become condensed to the degree named above, and the fire is made moderate, the cover must be compressed into the sirup until the main body of the cover is entirely immerged, and so it must remain until the sirup is cooked. During the operation the degree of condensation of the sirup can be tested by plunging an iron rod into it through the tube $e$; but a small allowance must be made to compensate the difference of condensation between the sirup near the bottom of the pan and that which is floating over the cover and has a lower degree of concentration.

This apparatus has the advantages of causing an extraordinary direct evaporation and of aiding the filtering operation, and, above all, it has that of concentrating the sirup to the degree of perfect crystallization under a comparatively low temperature, operating in that respect similar to the vacuum-pan. Crystallization is made perfect and the operation is performed with a great economy of fuel, time, and labor, and a very small quantity of molasses is formed, when compared with other modes of cooking sugar in an open pan. Direct fire may be applied; but I regard steam as preferable.

A floating cover like that herein described, or with some modifications, may be employed for other purposes than boiling sugar, as it is evident that my invention is susceptible of being used in the manufacturing of various substances and articles.

What I claim as of my invention, and desire to secure by Letters Patent, is—

The floating cover applied to the evaporation of saccharine liquids or for concentrating heat for other purposes, constructed, arranged, and operated substantially as herein set forth.

A. JOUAN.

Witnesses:
    T. T. EVERETT,
    B. F. RAY.